United States Patent
Kemmel et al.

(10) Patent No.: US 12,373,634 B2
(45) Date of Patent: Jul. 29, 2025

(54) LAYOUT DETECTION FOR BIDIRECTIONAL TEXT DOCUMENTS HAVING HEBREW TEXT

(71) Applicant: International Business Machines Corporation, Armonk, NY (US)

(72) Inventors: Lina Kemmel, Maale Adumim (IL); Tomer Mahlin, Jerusalem (IL); Gregory Brodsky, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/890,159

(22) Filed: Feb. 6, 2018

(65) Prior Publication Data
US 2019/0243878 A1    Aug. 8, 2019

(51) Int. Cl.
*G06F 40/129*    (2020.01)
*G06F 40/106*    (2020.01)

(52) U.S. Cl.
CPC .......... *G06F 40/129* (2020.01); *G06F 40/106* (2020.01)

(58) Field of Classification Search
CPC .. G06F 17/2223; G06F 17/212; G06F 40/129; G06F 40/106
USPC ........ 715/243, 244, 245, 255, 256, 264, 271
See application file for complete search history.

(56) References Cited

U.S. PATENT DOCUMENTS

| | | | | |
|---|---|---|---|---|
| 6,024,289 A * | 2/2000 | Ackley | ..................... | G06K 7/14 235/462.01 |
| 6,032,165 A * | 2/2000 | Andrews | ............... | G06F 40/129 715/209 |
| 8,249,356 B1 * | 8/2012 | Smith | ................ | G06K 9/00463 382/199 |
| 8,660,835 B2 | 2/2014 | Mousaad | | |
| 8,744,171 B1 | 6/2014 | Smith et al. | | |
| 8,782,516 B1 * | 7/2014 | Dozier | .................. | G06F 40/117 715/243 |
| 8,874,430 B2 * | 10/2014 | Al-Omari | ........... | G06F 16/9554 704/8 |

(Continued)

OTHER PUBLICATIONS

Word Palindrome in C; Dec. 2, 2014; stackoverflow.com; pp. 1-5.*

(Continued)

*Primary Examiner* — Andrew R Dyer
(74) *Attorney, Agent, or Firm* — Kimberly Zillig (57) ABSTRACT

A system and method for determining a layout of an electronic document containing bidirectional Hebrew text is disclosed. The system and method have a layout filter configured to determine if the electronic document is a candidate for layout detection based upon features of the electronic document, and an encoding detector configured to determine the encoding employed to encode characters in the electronic document; and an ordering detector configured to determine, based on the determined encoding, an ordering scheme employed in the electronic document. Additionally, a base direction detector configured to determine, based on the determined ordering scheme, a base direction of the electronic document based at least on non-Hebrew characters present in the electronic document; and a mirroring detector configured to determine a character mirroring state for the electronic document based upon the ordering scheme and a presence of at least one bracket pair in the electronic document.

11 Claims, 5 Drawing Sheets

(56) References Cited

U.S. PATENT DOCUMENTS

| | | | |
|---|---|---|---|
| 9,158,742 B2 | 10/2015 | El-Shishiny et al. | |
| 9,189,462 B2 | 11/2015 | Lanin et al. | |
| 2002/0143825 A1 | 10/2002 | Feinberg | |
| 2003/0014220 A1* | 1/2003 | Atkin | G06F 40/10 702/186 |
| 2003/0023590 A1* | 1/2003 | Atkin | G06F 17/30882 |
| 2005/0086211 A1* | 4/2005 | Mayer | G06F 16/951 |
| 2006/0106593 A1* | 5/2006 | Schultz | G06F 40/58 704/5 |
| 2010/0120454 A1* | 5/2010 | Xiao | H04W 4/18 455/466 |
| 2011/0093773 A1* | 4/2011 | Yee | G06F 16/9577 715/235 |
| 2011/0107202 A1* | 5/2011 | El-Shishiny | G06F 40/10 715/243 |
| 2012/0109634 A1* | 5/2012 | Lanin | G06F 17/2223 704/8 |
| 2016/0019301 A1* | 1/2016 | Goldenstein | G06F 17/30867 707/722 |
| 2016/0078656 A1* | 3/2016 | Borson | G06T 11/60 345/472 |
| 2016/0283830 A1* | 9/2016 | Oyakawa | G06K 15/1802 |
| 2017/0116175 A1* | 4/2017 | Alter | G06F 16/93 |
| 2018/0218033 A1* | 8/2018 | Utla | G06Q 30/02 |

OTHER PUBLICATIONS

David C. Zentgraf; What Every Programmer Absolutely, Positively Needs to Know About Encodings and Character Sets to Work With Text; Apr. 27, 2015; kunststube.net; pp. 1-14.*

Richard Ishida; Choosing & applying a character encoding; Jan. 26, 2016; World Wide Web Consortium; pp. 1-8.*

Finding words in a file, checking if they are palindrome; Nov. 23, 2014; stackoverflow.com; pp. 1-4.*

To find palindrome No. in a file; Apr. 14, 2009; roseindia.net; pp. 1-5.*

Unicode Bidirectional Algorithm basics; Aug. 9, 2016; World Wide Web Consortium; pp. 1-13.*

Bracket; Aug. 11, 2016; vocabulary.com; pp. 1-3.*

"determine;" Merriam Webster Dictionary; Aug. 29, 2017; https://www.merriam-webster.com/dictionary/determine; pp. 1-6.*

Unknown, "Bidirectional layout (or bidirectional format) terminology," IBM Knowledge Center, Version 14.0.0, printed Apr. 10, 2017, pp. 1. https://www.ibm.com/support/knowledgecenter/SSQ2R2_14.0.0/com.ibm.etools.zide.cmn.doc/topics/czdbiditerms.html.

Unknown, "H2: Respecting bidirectional attributes," Guideline H: Languages with a bidirectional script, IBM Software-Guidelines, printed Apr. 10, 2017, pp. 1-2. http://www-01.ibm.com/software/globalization/guidelines/h2.html.

Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

Davis et al. (eds.), "Unicode Bidirectional Algorithm," Unicode Standard Annex #9, Technical Reports, May 18, 2016, pp. 1-30. http://unicode.org/reports/tr9/.

"BidiBrackets-9.0.0.txt," Unicode Character Database, Jun. 7, 2016, pp. 1-3. http://www.unicode.org/Public/UCD/latest/ucd/BidiBrackets.txt.

Kirkegaard, E., "Semantic Analysis and meaning," Clear Language, Clear Mind: Emil O. W. Kirkegaard blog, Oct. 28, 2009, 4 pages, https://emilkirkegaard.dk/en/?p=1842.

"Introduction to Language," Lumen Learning, Boundless Psychology, Printed Oct. 4, 2019, 6 pages, https://courses.lumenlearning.com/boundless-psychology/chapter/introduction-to-language/.

"Semantics," Linguistics 201 (Professor Edward Vajda), Printed: Oct. 4, 2019, 11 pages, http://pandora.cii.wwu.edu/vajda/ling201/test3materials/semantics.htm.

* cited by examiner

LAYOUT DETECTION FOR BIDIRECTIONAL TEXT DOCUMENTS HAVING HEBREW TEXT

BACKGROUND

The present disclosure relates to determining a layout for an electronic text document, more specifically to determining a layout of bidirectional text containing Hebrew.

Languages have been used by humans for thousands of years. Languages first appeared as a spoken language. However, using the spoken word made it difficult to memorialize ideas, stories and histories. The first written language occurred in circa 3600 BCE in Mesopotamia. Each culture gradually developed its own written form of its spoken language. As each culture developed its own written form for its language, it would eventually develop a convention as to how the written language should be presented. This allowed for all individuals, who could read the language, to readily know how to read a "document" in that language. Conventions were based around how to represent the sounds/words associated with the particular language. Some languages used symbols to represent sounds. This eventually led to a proto-alphabet, and then to more modern alphabets. Some languages used symbols to represent words or concepts. Regardless of how the culture decided to represent its language in written form a convention was needed in how to present those symbols. Some cultures chose to present the symbols in a left-to-right order. That is the symbols would be read from left-to-right on the "document" to understand the concepts contained therein. Some cultures chose to present the symbols in a right-to-left order. That is the symbols would be read from right-to-left on the "document" to understand the concepts contained therein. Yet other cultures chose to present the symbols in a top-to-bottom order. That is the symbols would be read from top-to-bottom on the "document" to understand the concepts contained therein. As different cultures started to interact with each other, the need to communicate between each other increased. Often times cultures that use different ordering directions for their writing need to communicate using both of their written languages. However, because the languages used different ordering directions it became necessary to choose a particular ordering direction to present the information. The selection of the ordering direction was inherently determined by the individual who was creating the document, as they inherently know what ordering direction is most appropriate for the document.

SUMMARY

According to embodiments of the present disclosure, a system for determining a layout of an electronic document containing bidirectional Hebrew text is disclosed. The system has a layout filter configured to determine if the electronic document is a candidate for layout detection based upon features of the electronic document. Further, the system has an encoding detector configured to determine the encoding employed to encode characters in the electronic document; and an ordering detector configured to determine, based on the determined encoding, an ordering scheme employed in the electronic document. Additionally, the system includes a base direction detector configured to determine, based on the determined ordering scheme, a base direction of the electronic document based at least on non-Hebrew characters present in the electronic document; and a mirroring detector configured to determine a character mirroring state for the electronic document based upon the determined ordering scheme and a presence of at least one bracket pair in the electronic document.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to rendering electronic text document, more particular aspects relate to determining a layout of bidirectional text containing Hebrew. While the present disclosure is not necessarily limited to such applications, various aspects of the disclosure may be appreciated through a discussion of various examples using this context.

Languages are spoken and read by humans across the world. Many of the world's languages arose independently from each other, while others stemmed from a common base language. The spoken language gradually evolved into a written format. Each language adopted its own way of expressing the spoken language in a written form. Almost all languages adopted a series of symbols to represent various words. In some languages the symbols represent words or concepts. For example, Chinese and Japanese languages use symbols to represent words and concepts. In these languages, the symbols or combination of symbols represents the spoken words. In some languages, an alphabet is used. In languages that use alphabets each letter represents a sound, and a combination of letters represents the sounds associated with the word represented by the corresponding letters. There are a number of different alphabets that are used across many of the world's languages. In addition to languages representing words in different ways, the direction in which the language is read can vary between languages. Most languages that use an alphabet are read from left-to-right. For example, English, German, French, Spanish, Russian, Greek, etc. are read from left-to-right even though these languages do not share a common alphabet. There are a number of languages which are written from right-to-left. For example, Hebrew, Arabic, Farsi, etc. Hebrew and Arabic do not share a common alphabet, and as such some techniques used to identify Arabic and/or bidirectional layout of Arabic text (and related languages using Arabic script) cannot be used to identify Hebrew or the bidirectional layout of Hebrew text.

Bidirectional text documents are documents that include text that is written left-to-right and text written right-to-left. For example, the phrase "The names for the cities Ramla and Ramallah look very similar in Hebrew, רמלה versus רמאלה, which can be confusing for visitors." Includes text that reads left-to-right and text that reads right-to-left. The layout (describes the conditions (correlation between storage and display) under which text was originally authored.) of bidirectional text can be described with reference to five different characteristics. The first is ordering scheme, the second is base text direction, the third is character mirroring state, the fourth is letter shaping, and the fifth is digit shaping state. Both Hebrew and Arabic share the first three characteristics. However, the last two are unique to Arabic. However, displaying text in a manner that assures its best readability when the characteristics of the input text are unknown is extremely difficult. This can occur with the text to be displayed originates from a third party, is in plain text, and the text lacks any metadata describing the text layout. Prior solutions to this detection have relied on characteristics that are unique to Arabic, specifically using letter/digit shaping. So while prior solutions would work on Arabic, they cannot work with Hebrew text. The present discussion provides a solution to determine layout presentation when the document is a bidirectional plain text document that includes Hebrew words.

Layout detection is especially useful in situations where the corresponding text document is being transferred between two different systems that use different environments. That is, moving text created in one environment (with one specific standard bidi layout) to another environment (with different specific standard bidi layout). In some cases, those different environments may refer to different operating systems (e.g. mainframe and WINDOWS OS), while in other cases the different operating environments may refer to different applications running on the same operating system (e.g. a PDF file displayed inside ADOBE READER and data extracted from this PDF file and displayed in Notepad, as both ADOBE READER and Notepad run on WINDOWS OS). For historical reasons the designers of mainframes decided on supporting specific correlation between text storage and its display. In contrast the designers of, for example, WINDOWS based operating systems (and other modern operating systems such as ANDROID, iOS, OSx, LINUX, etc.) went on a different path and used different correlation from the mainframe approach between text storage and its display. To accommodate those different relations between storage and display on different platforms, text must be transformed when it is passed from one platform to another. PDF documents represent text in a similar manner as mainframes, and as such, also may require transformation prior to display on other platforms, such as WINDOWS operating systems.

Figure 1:
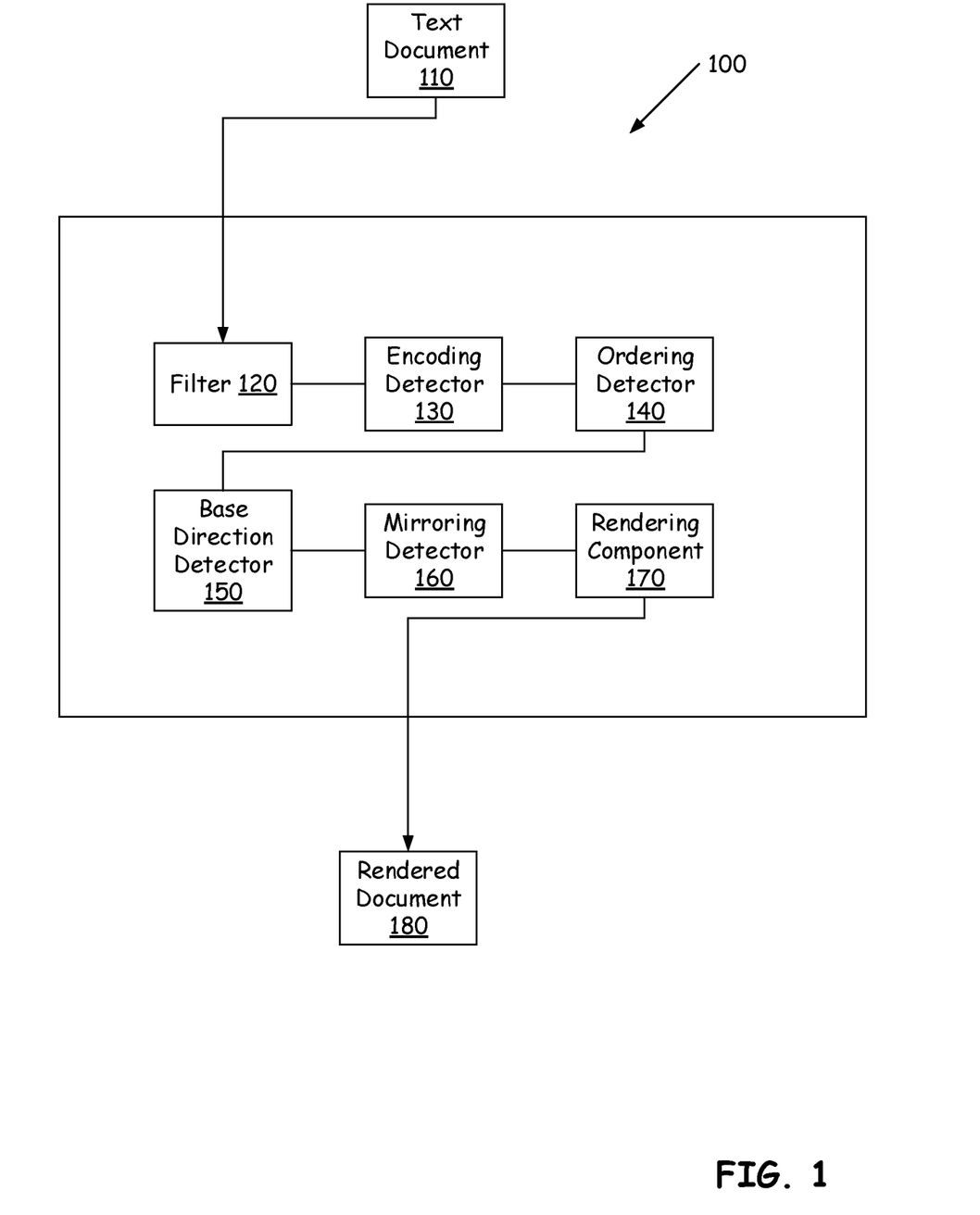
FIG. 1 is a block diagram illustrating components of a layout detection system for the Hebrew language according to illustrative embodiments.

FIG. 1 is a block diagram illustrating components of a layout detection system 100 for processing bidirectional text that includes the Hebrew language according to illustrative embodiments. The layout detection system 100 includes a layout filter 120, an encoding detector 130, an ordering detector 140, a base direction detector 150, a mirroring detection component 160, and a rendering component 170. The layout detection system 100 processes a text document 110 through the components to determine if the text document 110 is oriented in a right-to-left or a left-to-right orientation. While FIG. 1 illustrates a single text document 110, any number of text documents can be processed by the layout detection system 100.

Figure 2:
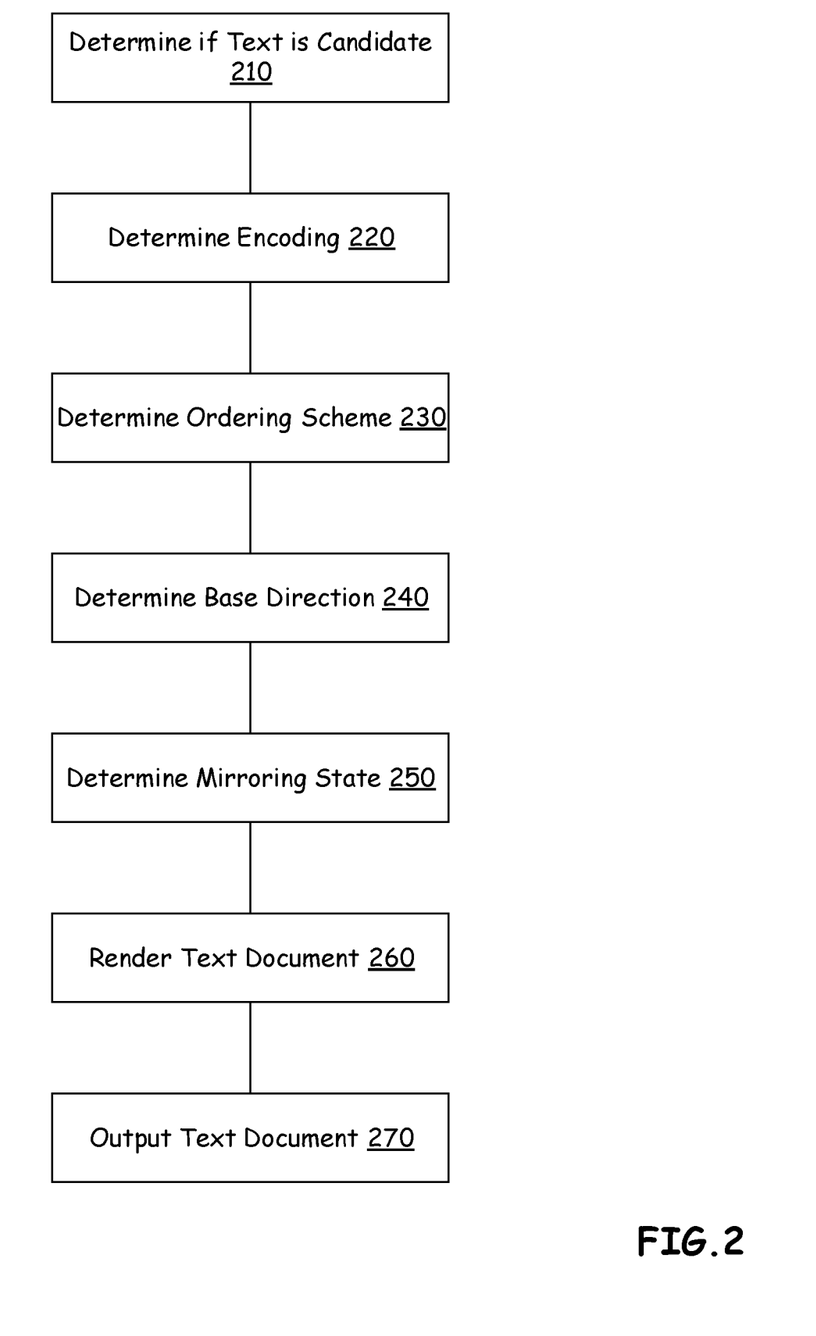
FIG. 2 is a flow diagram illustrating a process for automatically determining a text layout in a bidirectional text document that includes Hebrew text according to an illustrative embodiment.

FIG. 2 is a flow diagram illustrating a process for automatically determining a text layout in a bidirectional text document that includes Hebrew text according to an illustrative embodiment. For purposes of this discussion FIG. 1 and FIG. 2 are discussed together.

The process begins by first determining if the text document 110 is a candidate for layout detection using the process herein. This is illustrated at step 210. The layout filter 120 determines if the text document 110 meets the requirements of the system. The layout filter 120 determines if the text document 110 is in plain text. In some embodiments if the text document 110 is in a rich text format, such as HTML markup, the layout filter 120 can flag the document. In some embodiments, if the document is flagged by the layout filter 120 the document can be processed by the layout filter 120 to extract the plain text from the document. In other embodiments, the flag will alert the system that the document needs to be converted to plain text. In some embodiments, the process simply stops if the document is not in plain text.

The layout filter 120 further determines if the text document 110 has uniform layout characteristics. To determine the layout characteristics, the layout filter 120 can use any method for detecting the layout characteristics. If the text document 110 includes more than one uniform layout characteristic the text document 110 is not considered for further analysis and the process terminates.

The layout filter 120 further determines if the text document 110 contains meaningful Hebrew words. That is the layout filter 120 can analyze the text document 110 to determine if the Hebrew present are actual Hebrew words. This can be accomplished by passing the text document 110 through a spell checker or grammar checker module that includes support for the Hebrew language. In other embodiments, the text document 110 is compared against a dictionary of Hebrew words. This comparison is performed to ensure that the text document 110 actually contains Hebrew words as opposed to Hebrew letters randomly put together. If no Hebrew words are detected, the process ends. Even if the text document 110 contains Hebrew words, the layout filter 120 performs a final check on the text document 110. This check is to ensure that the text document 110 does not contain all palindromes. Palindromes are words that are spelled the same both forward and backwards. In English common palindromes are "MOM", "DAD", "LEVEL", "NOON", "KAYAK", etc. In Hebrew some common palindromes are "אבא" (father, dad), "אמא" (mother, mom), "שמש" (sun), "הלילה" (tonight), "סוס" (horse), "שש" (six), etc. Palindromes make detection in plain text of textual direction difficult because they do not provide information informative of the direction of the text that is usable, because as the word is presented in either right-to-left or left-to-right text it still forms the same viable word. In some embodiments, the layout filter 120 determines that the basic Hebrew alphabetic characters (U+05D0 . . . U+05EA Unicode range or equivalent if the text is not encoded in Unicode) that form meaningful non-palindromic text should be over a dozen words. In some embodiments where there is a need to distinguish between visual left-to-right and visual right-to-left layouts, the number of non-Hebrew left-to-right characters that form meaningful non-palindromic text should be over a dozen words.

Once the text document 110 has been determined to be a candidate for layout detection, the process moves to detecting the character encoding. This is illustrated at step 220. The encoding detector 130 maps the raw bytes forming the data in the text document 110 to characters. The encoding detector 130 can automatically detect the character encoding. In some embodiments, the encoding detector 130 uses an n-gram model such as the model provided by the International Components for Unicode or the Mozilla Charset Detector. However, other models can be used. The encoding detector 130 can determine, using the corresponding model, if the text document 110 contains characters that are in Unicode, single-byte Hebrew, non-Unicode non-Hebrew, or non-Unicode but undefined characters. In some embodiments, the encoding detector 130 incorporates natural language detection. Natural language detection can allow for the determination that the text document 110 contains meaningful text in one or more languages. When natural language detection is incorporated into the encoding detector 130, any natural language detection process can be used.

Following the detection of character encoding, the process detects an ordering scheme in the text document 110. This is illustrated at step 230. The ordering detector 140 determines if the ordering scheme is logical or visual. To determine if the ordering scheme is logical or visual the ordering detector 140 determines if the meaningful Hebrew content of the text document 110 is found in the original or reversed text. If it is found in the original then the ordering is logical. If it is found in the reversed text then the ordering is visual.

The ordering detector 140 takes the results from the encoding detector 130, and depending on the results of the encoding detector 130, analyzes the text document 110 differently. If the encoding detector 130 detected non-Unicode non-Hebrew encoding the system performs no further action as the text does not include Hebrew. If the encoding detector 130 detected a non-Unicode Hebrew encoding this is indicative that the text document 110 included some meaningful Hebrew text. As meaningful Hebrew was found in the text document 110, and it was encoded in non-Unicode the ordering scheme is determined to be logical. This is because the scheme type matches a scheme type expected by the encoding detector 130. As the ordering scheme has been determined, the process can move to the step 240.

If the encoding detector 130 determined that the text document 110 was encoded in Unicode, the ordering detector 140 performs an extraction on the text document 110. In some embodiments the extraction extracts all of the Hebrew characters in the text document 110. The Hebrew characters (or words) can be extracted by matching the content against a regular expression describing a single Hebrew character (or continuous character sequence). This is done, for example, by looking for characters in the U+05D0 . . . U+05EA Unicode range. These characters are merged into a single fragment where each continuous sequence of Hebrew characters is separated by white space. If there are no Hebrew characters present in the fragments, the processing of the text document 110 stops. However, if there is Hebrew text present in the text document 110 the Hebrew text is converted to single byte Hebrew by encoding the characters in according to ISO-8859-8-I. If the text is converted to single byte Hebrew encoding the process returns back to step 220 and repeats (thereby detecting the single byte Hebrew encoding). In some embodiments, instead of repeating, the process continues to step 235.

If the text was determined to be non-Unicode and undefined characters, the process reverses the characters of the text document 110. This is illustrated at step 235. The reversal of the characters allows for the possibility that the text document 110 still contains meaningful Hebrew text, but that the text is ordered visually and not logically. The encoding detector 130 expects that the text will be ordered logically. To reverse the order of the text the order of the bytes forming the text is reversed. For example, if the text in the text document 110 is "תולמ" it would be reversed to read "תולמ". The reversed text is then returned to the encoding detector 130 and step 220 is rerun using this reversed text. If upon the return through step 220 the encoding detector 130 determines that the reversed text is encoded in single byte Hebrew, the ordering detector 140 determines that the ordering scheme is visual. If the encoding for the reversed text was determined to be non-Hebrew or undefined during the rerunning of step 220 the text is determined to not be Hebrew and further processing is stopped.

Once the encoding has been determined as well as the ordering scheme the process proceeds to detect the base direction of the text document 110. This is illustrated at step 240. In some embodiments prior to performing step 240 the system can convert the original text to Unicode Transformation Format 32 (UTF-32) if the original text document 110 was not already in this format. The base direction of the text document 110 can be either left-to-right or right-to-left. Depending on the ordering scheme determined at step 230 the process executed by the base direction detector 150 for base detection is slightly different. For a text document 110 that was determined to have a logical ordering scheme a count of the strong right-to-left and left-to-right characters is made. The order in which the right-to-left or left-to-right characters are counted can vary or be done simultaneously. Strong left-to-right characters are, for example, most alphabetic, syllabic, Han ideographs, non-European or non-Arabic digits, etc. Strong right-to-left characters are, for example, Hebrew alphabet, and related punctuation. The number of right-to-left strong characters is compared to the number of left-to-right strong characters. The direction that has the highest number of corresponding characters is determined to be the direction of the text. For example, the phrase "The name of the airport in Israel is written in Hebrew as מל התע פה הבינג אומי בן גוריון." would count 26 strong right-to-left letters and 46 strong left-to-right letters. As such the base direction detector 150 would determine that the text is in left-to-right base direction. In contrast the phrase ".Explorer מכונית פורד היא בישראל זופולרית" would count 8 strong left-to-right letters and 27 strong right-to-left letters. If presented in logical formatting the phrase would appear in the plain text document 110 as "כמוניתי פופ ירלת ביש׳ דרוף איה לא Explorer." As the number of strong right-to-left characters exceeds the number of strong left-to-right characters the text is considered to have the base direction of right-to-left. If the number of characters having a strong right-to-left and the number of characters having a strong left-to-right are the same, the base direction, in some embodiments, is determined to be left-to-right.

When the ordering scheme was determined to be visual by the ordering detector 140 the base direction detector 150 determines the base direction differently from the approach used when the text document 110 is in a logical order. In contrast to the approach used for logical order, the base direction detector 150 only considers the non-Hebrew portions of the text document 110. If in the prior steps a left-to-right language was identified the base direction is determined to be left-to-right. If no left-to-right language was detected, and no left-to-right script was detected, the base direction of the text document 110 is also determined to be left-to-right.

However, if there is detected left-to-right script, it is possible that the text is meaningful, but is ordered as visual right-to-left text. This is the opposite of what the encoding detector 130 expects. In this instance the left-to-right portions of the text document 110 have their order reversed. This reversed text is passed through the encoding detector 130 to detect a language using the natural language detector of the encoding detector 130. However, another natural language detector can be used. If a language using left-to-right text is detected, at this point, by the encoding detector 130, the base direction is determined to be right-to-left. Otherwise, the base direction is determined to be left-to-right.

Following the determination of the base direction the system proceeds to determine if character mirroring is on or off. This is illustrated at step 250. Character mirroring occurs when there are bracket pairs. Bracket pairs are characters that consist of an opening and a closing bracket, such as "(", ")", "<", ">", "{", "}", etc. The mirroring detection component 160 scans the text document 110 to determine if the text document 110 contains at least one pair of brackets consisting of the opening and closing brackets. If the text document 110 does not include any bracket pairs, the mirroring detection component 160 assigns the text document 110 a mirroring status based upon the determined ordering scheme. If the ordering scheme is logical then character mirroring is determined to be off. If the ordering scheme is visual then the character mirroring is determined to be on.

If a bracket pair is found the mirroring detection component 160 again considers the determined ordering scheme. If the ordering scheme was determined to be logical and a bracket with an open property proceeds a bracket with a close property the character mirroring state is determined to be off. Otherwise, the character mirroring state is determined to be on. A bracket has the property of "open" when it is the leading character of a phrase or word, and has the property of "close" when it is the trailing character of the phrase or word. If the ordering scheme was determined to be visual, and a bracket with a close property proceeds a bracket with an open property the character mirroring state is determined to be off. Otherwise, the character mirroring state is determined to be off.

In some embodiments, the text document 110 is augmented with metadata. This metadata includes the determined orientation and the determined ordering scheme. In these embodiments, the text document 110 can be stored for later retrieval and rendering without having to repeat the process above in real time.

Following the completion of step 250 the text document 110 is rendered. This is illustrated at step 260. When the document is rendered the rendering component 170 uses the determined right-to-left or left-to-right orientation and the logical or visual ordering scheme to prepare the text document 110 accordingly. That is, for example, the plain text of "דרופ איה לא רשיב תירל יפוט תיונכמ.Explorer" is rendered as ".Explorer דרופ איה ביישראל רית פופור מכונית". The rendered document 180 is then output by the rendering component 170. This output can be printing the document, displaying the document, or any other form of output. This is illustrated at step 270. Following the output, the process ends.

Disclosed herein in is a computer program product having computer executable instructions that when executed by at least one computing device, cause the at least one computing device to determine a layout direction for at least one electronic document. The computer program product comprises instructions to perform the following actions. It should be noted that, in this embodiment, the computer program product has these instructions programed into such that it can perform each set of instructions regardless of which path results from the electronic document. The instructions cause the electronic document to be received, the electronic document including bidirectional text wherein at least a portion of the bidirectional text includes Hebrew text. Next the instructions determine if the electronic document is in plain text. Any approach to determine if the document is in plain text can be used. The computer program product includes instructions to convert the electronic document to plain text such that the electronic document is in plain text. Further there are instructions to determine if the electronic document has uniform layout characteristics. The computer program product includes instructions such that when the electronic document does not have uniform layout characteristics, the layout direction process is terminated. The computer program product includes instructions such that when the electronic document has uniform layout characteristics, it can determine if the electronic document includes actual Hebrew words in the Hebrew text.

The computer program product includes instructions such that when the electronic document does not contain actual Hebrew words, it can terminate the layout detection process. The computer program product includes instructions such that when the electronic document contains actual Hebrew words, it can determine if all of the actual Hebrew words in the Hebrew text are palindromes. The computer program product further includes instructions such that when all of the actual Hebrew words are palindromes; it can terminate the layout detection process.

The computer program product includes instructions such that when the Hebrew words are not all palindromes, it can detect a character encoding for the electronic document. The computer program product includes instructions such that when the detected character encoding is non-Unicode non-Hebrew encoding, it can terminate the layout detection process.

The computer program product includes instructions such that when the detected encoding is non-Unicode Hebrew, it can determine the ordering scheme is a logical ordering scheme based on the detected encoding.

The computer program product includes instructions such that when the detected character encoding is Unicode, it can extract all Hebrew characters from the electronic document, convert the extracted Hebrew characters to single byte Hebrew, and determine if the extracted Hebrew characters form actual Hebrew words. The computer program product includes instructions such that when the extracted Hebrew characters form actual Hebrew words, it can determine the ordering scheme is logical.

The computer program product includes instructions such that when the extracted Hebrew characters do not form actual Hebrew words, it can reverse the extracted Hebrew characters to create a reversed version of the extracted Hebrew characters. It can then determine if the reversed version contains actual Hebrew words. The computer program product includes instructions such that when the reversed version is determined to contain actual Hebrew words, it determine the ordering scheme is visual. The computer program product includes instructions such that when the reversed version does not contain actual Hebrew words, it can terminate the layout detection process.

The computer program product includes instructions such that when the detected character encoding is determined to be non-Unicode and undefined characters, it can reverse the Hebrew characters to create a second reversed version of the Hebrew characters, detect the character encoding for the second reversed version. The computer program product includes instructions such that when the detected character encoding for the second reversed version is non-Hebrew or undefined, it can terminate the layout detection process. The computer program product includes instructions such that when the detected character encoding for the second reversed version is single byte Hebrew, it can determine if the second reversed version contains actual Hebrew words. When the second reversed version is determined to contain actual Hebrew words, the instructions can determine the ordering scheme is visual. When the second reversed version does not contain actual Hebrew words, the instructions can terminate the layout detection process. The computer program product can determine if the electronic document is Unicode Transformation Format 32 (UTF-32) and when the electronic document is not in UTF-32, the instructions can convert the electronic document UTF-32.

The computer program product includes instructions such that when the ordering scheme is logical, it can determine a base direction by executing instructions to determine a first number of characters in the electronic document that are strong left-to-right characters, determining a second number of characters in the electronic document that are strong right-to-left characters, and comparing the first number of characters to the second number of characters. The computer program product includes instructions such that when the first number of characters is greater than the second number of characters, it determines the base direction of left-to right. The computer program product includes instructions such that when the first number of characters is less than the second number of characters, it determines the base direction of right-to-left.

The computer program product includes instructions such that when the ordering scheme is visual, the instructions can determine the base direction by determining if a left-to-right script is present in the electronic document. The computer program product includes instructions such that when left-to-right script is not present in the electronic document, it can determine the base direction of left-to-right. The computer program product includes instructions such that when left-to-right script is present, it can determine if a left-to-right language is present in non-Hebrew portions of the electronic document. The computer program product includes instructions such that when a left-to-right language is present in the electronic document, the instructions determine the base direction of left-to-right. When a left-to-right language is not present in the electronic document, the instructions can reverse the left-to-right script to create a third reversed version of the electronic document, and determine a language associated with the third reversed version. The computer program product includes instructions such that when the language associated with the third reversed version is determined to be a left-to right language, it can determine the base direction of right-to left, and when the language associated with the third reversed version is determined not to be a left-to-right language, the instructions can determine the base direction of left-to-right.

The computer program product includes instructions such that determine if the electronic document includes at least one bracket pair. When the electronic document does not include at least one bracket pair and the ordering scheme is logical, the instructions determine that character mirroring is off. When the electronic document does not include at least one bracket pair and the ordering scheme is visual, the instructions determine character mirroring is on. The computer program product includes instructions such that when the electronic document includes at least one bracket pair, it can determine if a bracket having an open property precedes a bracket having a close property. When the bracket having the open property precedes the bracket having the close property and the ordering scheme is logical, the instructions can determine character mirroring is off, and when the bracket having the open property does not precede the bracket having the close property and the ordering scheme is logical, the instructions can determine character mirroring is on. The computer program product includes instructions such that when the bracket having the open property precedes the bracket having the close property and the ordering scheme is visual, in can determine character mirroring is on, and when the bracket having the open property does not precede the bracket having the close property and the ordering scheme is visual, the instructions can determine character mirroring is on. Following the process of layout direction the instructions render the electronic document based upon the determined ordering scheme and base direction.

Figure 3:
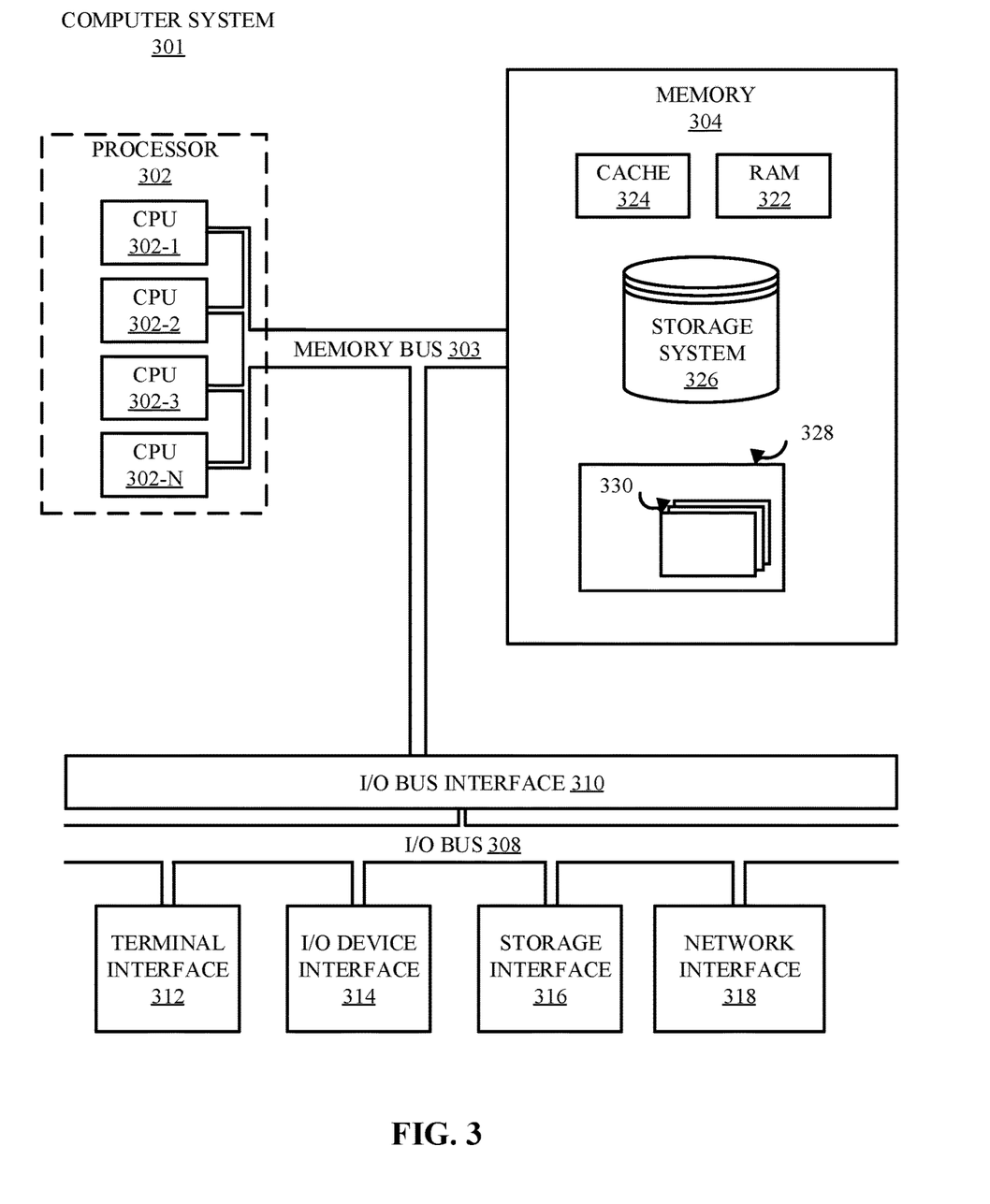
FIG. 3 is a block diagram illustrating a computing system according to one embodiment.

Referring now to FIG. 3, shown is a high-level block diagram of an example computer system 301 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 301 may comprise one or more CPUs 302, a memory subsystem 304, a terminal interface 312, a storage interface 316, an I/O (Input/Output) device interface 314, and a network interface 318, all of which may be communicatively coupled, directly or indirectly, for inter-component communication via a memory bus 303, an I/O bus 308, and an I/O bus interface unit 310.

The computer system 301 may contain one or more general-purpose programmable central processing units (CPUs) 302-1, 302-2, 3023, 302-N, herein collectively referred to as the CPU 302. In some embodiments, the computer system 301 may contain multiple processors typical of a relatively large system; however, in other embodiments the computer system 301 may alternatively be a single CPU system. Each CPU 302 may execute instructions stored in the memory subsystem 304 and may include one or more levels of on-board cache.

System memory 304 may include computer system readable media in the form of volatile memory, such as random access memory (RAM) 322 or cache memory 324. Computer system 301 may further include other removable/non-removable, volatile/non-volatile computer system storage media. By way of example only, storage system 326 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 304 can include flash memory, e.g., a flash memory stick drive or a flash drive. Memory devices can be connected to memory bus 303 by one or more data media interfaces. The memory 304 may include at least one program product having a set (e.g., at least one) of program modules that are configured to carry out the functions of various embodiments.

Although the memory bus 303 is shown in FIG. 3 as a single bus structure providing a direct communication path among the CPUs 302, the memory subsystem 304, and the I/O bus interface 310, the memory bus 303 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 310 and the I/O bus 308 are shown as single respective units, the computer system 301 may, in some embodiments, contain multiple I/O bus interface units 310, multiple I/O buses 308, or both. Further, while multiple I/O interface units are shown, which separate the I/O bus 308 from various communications paths running to the various I/O devices, in other embodiments some or all of the I/O devices may be connected directly to one or more system I/O buses.

In some embodiments, the computer system 301 may be a multi-user mainframe computer system, a single-user system, or a server computer or similar device that has little or no direct user interface, but receives requests from other computer systems (clients). Further, in some embodiments, the computer system 301 may be implemented as a desktop computer, portable computer, laptop or notebook computer, tablet computer, pocket computer, telephone, smart phone, network switches or routers, or any other appropriate type of electronic device.

It is noted that FIG. 3 is intended to depict the representative major components of an exemplary computer system 301. In some embodiments, however, individual components may have greater or lesser complexity than as represented in FIG. 3, components other than or in addition to those shown in FIG. 3 may be present, and the number, type, and configuration of such components may vary.

One or more programs/utilities 328, each having at least one set of program modules 330 may be stored in memory 304. The programs/utilities 328 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 328 and/or program modules 330 generally perform the functions or methodologies of various embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
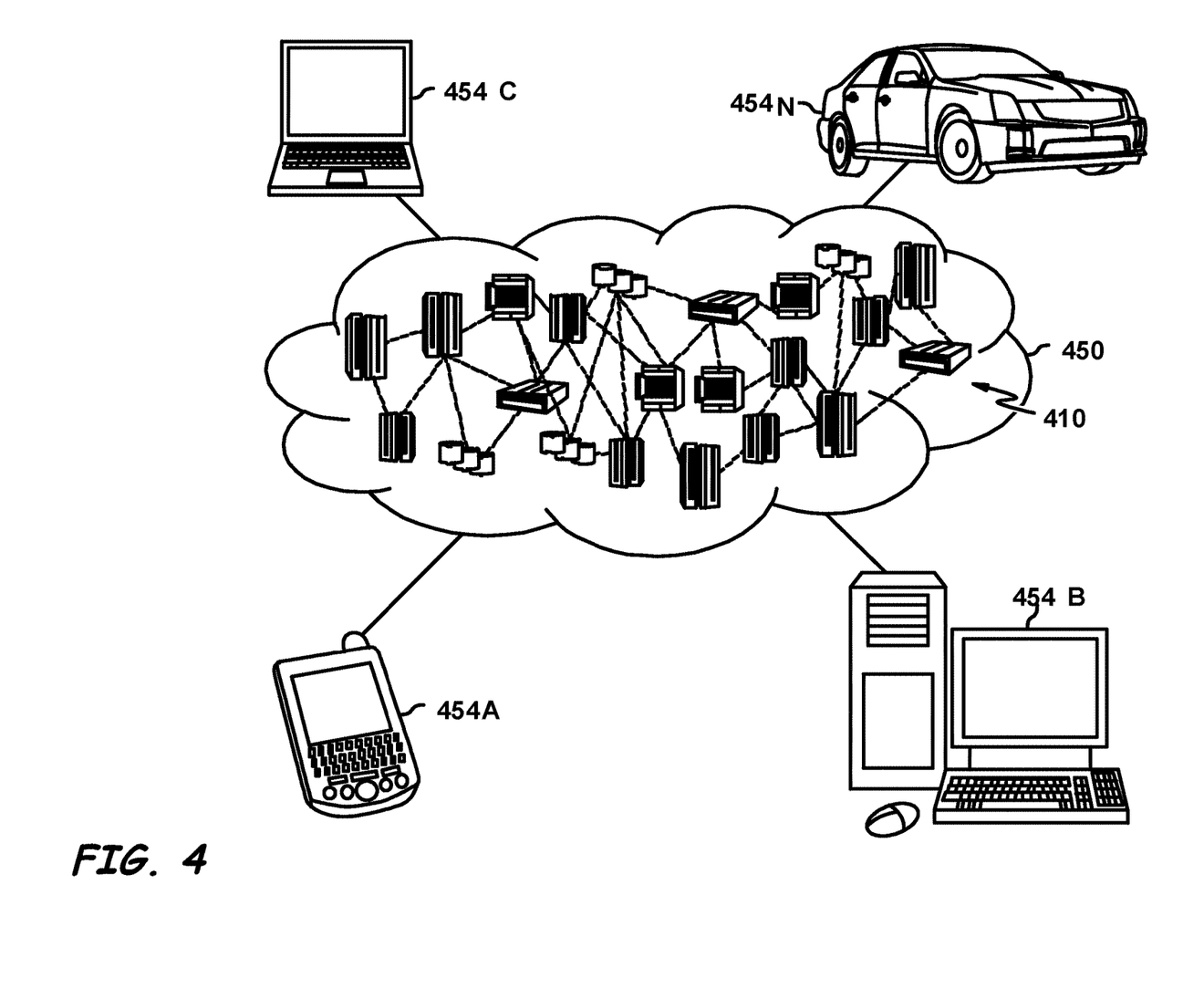
FIG. 4 is a diagrammatic representation of an illustrative cloud computing environment.

The system 50 may be employed in a cloud computing environment. FIG. 4, is a diagrammatic representation of an illustrative cloud computing environment 450 according to one embodiment. As shown, cloud computing environment 450 comprises one or more cloud computing nodes 95 with which local computing devices used by cloud consumers, such as, for example, personal digital assistant (PDA) or cellular telephone 454A, desktop computer 454B, laptop computer 454C, and/or automobile computer system 454N may communicate. Nodes 95 may communicate with one another. They may be grouped (not shown) physically or virtually, in one or more networks, such as Private, Community, Public, or Hybrid clouds as described hereinabove, or a combination thereof. This allows cloud computing environment 450 to offer infrastructure, platforms and/or software as services for which a cloud consumer does not need to maintain resources on a local computing device. It is understood that the types of computing devices 454A-N shown in FIG. 4 are intended to be illustrative only and that computing nodes 5 and cloud computing environment 450 may communicate with any type of computerized device over any type of network and/or network addressable connection (e.g., using a web browser).

Figure 5:
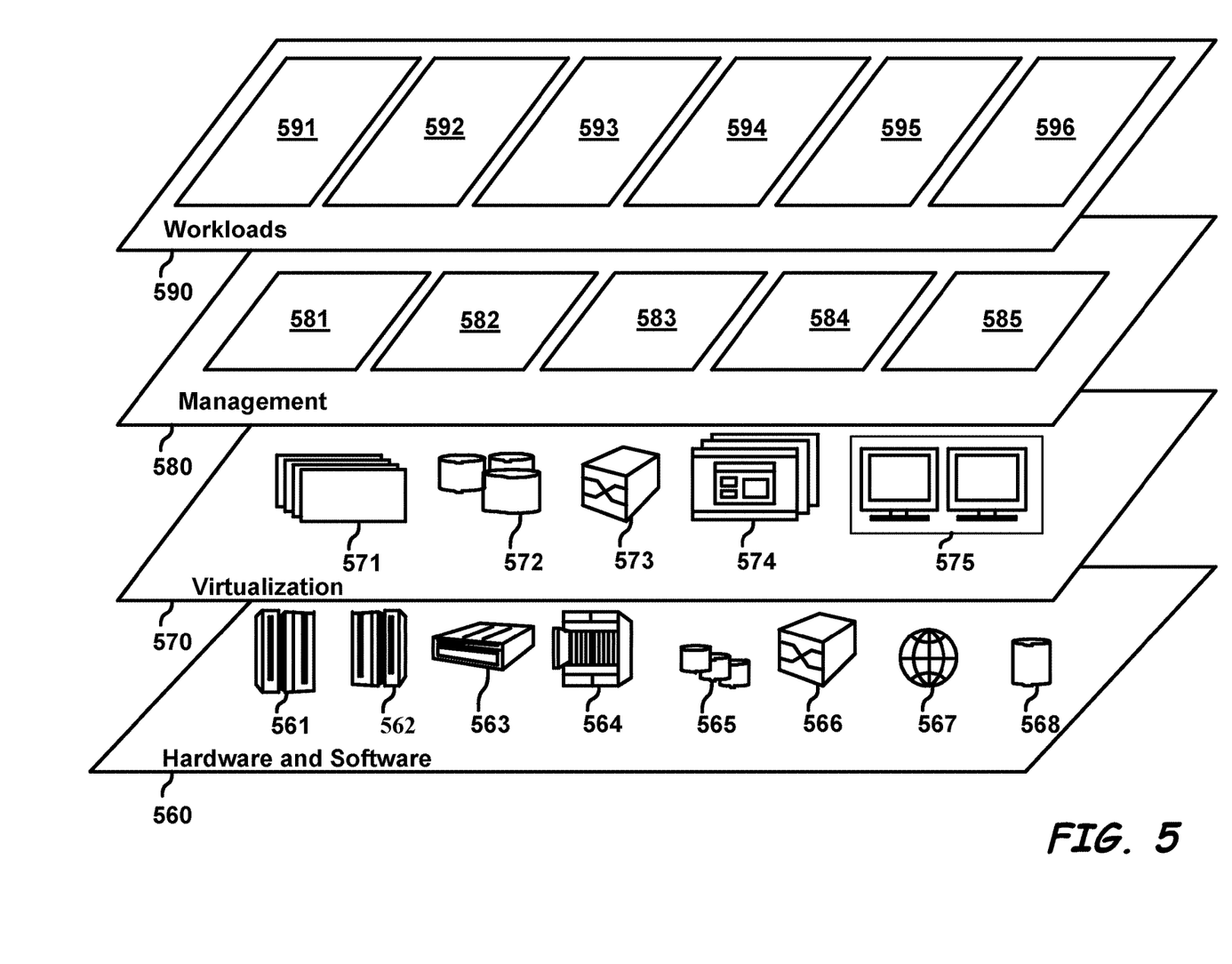
FIG. 5 illustrates a set of functional abstraction layers provided by cloud computing environment according to one illustrative embodiment.

Referring now to FIG. 5, a set of functional abstraction layers provided by cloud computing environment 450 (FIG. 4) is shown. It should be understood in advance that the components, layers, and functions shown in FIG. 5 are intended to be illustrative only and embodiments of the disclosure are not limited thereto. As depicted, the following layers and corresponding functions are provided:

Hardware and software layer 560 includes hardware and software components. Examples of hardware components include: mainframes 561; RISC (Reduced Instruction Set Computer) architecture based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities may be provided: virtual servers 571; virtual storage 572; virtual networks 573, including virtual private networks; virtual applications and operating systems 574; and virtual clients 575.

In one example, management layer 580 may provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include: mapping and navigation 591; software development and lifecycle management 592; layout detection 593; data analytics processing 594; transaction processing 595; and database 596.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer executable method for determining a layout direction for at least one electronic document containing bidirectional Hebrew text, comprising:
    receiving an electronic document, the electronic document including bidirectional text wherein at least a portion of the bidirectional text includes Hebrew text;
    determining if the electronic document is in plain text;
    determining that the electronic document contains meaningful Hebrew words in the Hebrew text;
    determining, in response to the electronic document containing meaningful Hebrew words, that the meaningful Hebrew words are not all palindromes;
    detecting a character encoding for the electronic document, in response to determining that the meaningful Hebrew words are not all palindromes;
    determining an ordering scheme in response to the detected character coding not being non-Unicode non-Hebrew encoding;
    determining a base direction of the electronic document based at least on non-Hebrew characters present in the electronic document;
    determining a character mirroring state for the electronic document based upon the determined ordering scheme and a status of a presence of at least one bracket pair in a portion of the electronic document that is to be rendered; and
    rendering the electronic document based on the determined ordering scheme and the determined base direction.

2. The method of claim 1 wherein if the document is determined not to be in plain text, the method further comprising:
    converting the electronic document to be in plain text.

3. The method of claim 1 further comprising:
    determining that the electronic document has uniform layout characteristics.

4. The method of claim 1 wherein detecting character encoding determines that encoding is non-Unicode Hebrew, the method further comprising:
  determining the ordering scheme is a logical ordering scheme.

5. The method of claim 1 wherein determining a character encoding determines that the character encoding is Unicode, the method further comprising:
  extracting all Hebrew characters from the electronic document;
  converting the extracted Hebrew characters to single byte Hebrew;
  determining if the extracted Hebrew characters form actual Hebrew words;
  when the extracted Hebrew characters form actual Hebrew words, determining the ordering scheme is logical;
  when the extracted Hebrew characters do not form actual Hebrew words, reversing the extracted Hebrew characters to create a reversed version of the extracted Hebrew characters;
  determining if the reversed version contains actual Hebrew words; and
  when the reversed version is determined to contain actual Hebrew words, determine the ordering scheme is visual.

6. The method of claim 1 wherein determining a character encoding determines that the character encoding is non-Unicode and undefined characters,
  reversing the Hebrew characters to create a reversed version of the Hebrew characters;
  detecting the character encoding for the-reversed version;
  when the detected character encoding for the reversed version is single byte Hebrew, determining if the reversed version contains actual Hebrew words;
  when the reversed version is determined to contain actual Hebrew words, determining the ordering scheme is visual.

7. The method of claim 1 further comprising:
  converting the electronic document to Unicode Transformation Format 32 (UTF- 32).

8. The method of claim 1 wherein when the ordering scheme is logical, determining the base direction further comprises:
  determining a first number of characters in the electronic document that are strong left-to-right characters;
  determining a second number of characters in the electronic document that are strong right-to-left characters;
  comparing the first number of characters to the second number of characters;
  when the first number of characters is greater than the second number of characters, determining the base direction of left-to right; and
  when the first number of characters is less than the second number of characters, determining the base direction of right-to-left.

9. The method of claim 1 wherein when the ordering scheme is visual, determining the base direction further comprises:
  determining if a left-to-right script is present in the electronic document;
  when left-to-right script is not present in the electronic document, determining the base direction of left-to-right;
  when left-to-right script is present, determining if a left-to-right language is present in non-Hebrew portions of the electronic document;
  when a left-to-right language is present in the electronic document, determining the base direction of left-to-right;
  when a left-to-right language is not present in the electronic document, reversing the left-to-right script to create a third reversed version of the electronic document;
  determining a language associated with the third reversed version;
  when the language associated with the third reversed version is determined to be a left-to right language, determining the base direction of right-to left; and
  when the language associated with the third reversed version is determined not to be a left-to-right language, determining the base direction of left-to-right.

10. The method of claim 1 wherein determining a character mirroring state further comprises:
  determining if the electronic document includes at least one bracket pair;
  when the electronic document does not include at least one bracket pair and the ordering scheme is logical, determining character mirroring is off;
  when the electronic document does not include at least one bracket pair and the ordering scheme is visual, determining character mirroring is on;
  when the electronic document includes at least one bracket pair, determining if a bracket having an open property precedes a bracket having a close property;
  when the bracket having the open property precedes the bracket having the close property and the ordering scheme is logical, determining character mirroring is off;
  when the bracket having the open property does not precede the bracket having the close property and the ordering scheme is logical, determining character mirroring is on;
  when the bracket having the open property precedes the bracket having the close property and the ordering scheme is visual, determining character mirroring is on; and
  when the bracket having the open property does not precede the bracket having the close property and the ordering scheme is visual, determining character mirroring is on.

11. A computer program product having computer executable instructions that when executed by at least one computing device to determine a layout direction for at least one electronic document, comprising instructions to:
  receive an electronic document, the electronic document including bidirectional text wherein at least a portion of the bidirectional text includes Hebrew text;
  determine if the electronic document is in plain text;
  when the electronic document is not in plain text, convert the electronic document to plain text such that the electronic document is in plain text;
  when the electronic document is in plain text, determine if the electronic document has uniform layout characteristics;
  when the electronic document does not have uniform layout characteristics, terminate the layout direction process;
  when the electronic document has uniform layout characteristics, determine if the electronic document includes actual Hebrew words in the Hebrew text;
  when the electronic document does not contain actual Hebrew words, terminate the layout detection process;

when the electronic document contains actual Hebrew words, determine if all of the actual Hebrew words in the Hebrew text are palindromes;
  when all of the actual Hebrew words are palindromes; terminate the layout detection process;
when the Hebrew words are not all palindromes, detect a character encoding for the electronic document;
when the detected character encoding is non-Unicode non-Hebrew encoding, terminate the layout detection process;
when the detected encoding is non-Unicode Hebrew, determine the ordering scheme is a logical ordering scheme;
when the detected character encoding is Unicode,
  extract all Hebrew characters from the electronic document;
  convert the extracted Hebrew characters to single byte Hebrew;
  determine if the extracted Hebrew characters form actual Hebrew words;
  when the extracted Hebrew characters form actual Hebrew words, determine the ordering scheme is logical;
  when the extracted Hebrew characters do not form actual Hebrew words, reverse the extracted Hebrew characters to create a reversed version of the extracted Hebrew characters;
  determine if the reversed version contains actual Hebrew words;
  when the reversed version is determined to contain actual Hebrew words, determine the ordering scheme is visual;
  when the reversed version does not contain actual Hebrew words; terminate the layout detection process;
when the detected character encoding is determined to be non-Unicode and undefined characters,
  reverse the Hebrew characters to create a second reversed version of the Hebrew characters;
  detect the character encoding for the second reversed version;
  when the detected character encoding for the second reversed version is non-Hebrew or undefined, terminate the layout detection process;
  when the detected character encoding for the second reversed version is single byte Hebrew, determine if the second reversed version contains actual Hebrew words;
  when the second reversed version is determined to contain actual Hebrew words, determine the ordering scheme is visual;
  when the second reversed version does not contain actual Hebrew words;
  terminate the layout detection process;
determine if the electronic document is Unicode Transformation Format 32 (UTF-32),
  when the electronic document is not in UTF-32, convert the electronic document UTF-32;
when the ordering scheme is logical, determine a base direction by:
  determine a first number of characters in the electronic document that are strong left-to-right characters;
  determine a second number of characters in the electronic document that are strong right-to-left characters;
  compare the first number of characters to the second number of characters;
  when the first number of characters is greater than the second number of characters, determine the base direction of left-to right;
  when the first number of characters is less than the second number of characters, determine the base direction of right-to-left;
when the ordering scheme is visual, determine the base direction by:
  determine if a left-to-right script is present in the electronic document;
  when left-to-right script is not present in the electronic document, determine the base direction of left-to-right;
  when left-to-right script is present, determine if a left-to-right language is present in non-Hebrew portions of the electronic document;
  when a left-to-right language is present in the electronic document, determine the base direction of left-to-right;
  when a left-to-right language is not present in the electronic document, reverse the left-to-right script to create a third reversed version of the electronic document;
    determine a language associated with the third reversed version;
    when the language associated with the third reversed version is determined to be a left-to right language, determine the base direction of right-to left;
    when the language associated with the third reversed version is determined not to be a left-to-right language, determine the base direction of left-to-right;
determine if the electronic document includes at least one bracket pair;
  when the electronic document does not include at least one bracket pair and the ordering scheme is logical, determine character mirroring is off;
  when the electronic document does not include at least one bracket pair and the ordering scheme is visual, determine character mirroring is on;
  when the electronic document includes at least one bracket pair, determine if a bracket having an open property precedes a bracket having a close property;
    when the bracket having the open property precedes the bracket having the close property and the ordering scheme is logical, determine character mirroring is off;
    when the bracket having the open property does not precede the bracket having the close property and the ordering scheme is logical, determine character mirroring is on;
    when the bracket having the open property precedes the bracket having the close property and the ordering scheme is visual, determine character mirroring is on;
    when the bracket having the open property does not precede the bracket having the close property and the ordering scheme is visual, determine character mirroring is on; and
render the electronic document based upon the determined ordering scheme and base direction.

* * * * *